United States Patent
Asano et al.

(10) Patent No.: US 6,415,747 B1
(45) Date of Patent: Jul. 9, 2002

(54) TWO STROKE, MULTIPLE CYLINDER ENGINE FOR SMALL VEHICLE

(75) Inventors: Kiyomori Asano; Hiroyuki Okada; Hitoshi Kato, all of Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/337,141

(22) Filed: Jun. 21, 1999

(30) Foreign Application Priority Data

Jun. 19, 1998 (JP) .......................... 10-172888
Jun. 30, 1998 (JP) .......................... 10-184255

(51) Int. Cl.[7] .................... F02B 75/06; F02B 27/00
(52) U.S. Cl. ...................... 123/65 EM; 123/65 E; 123/51 R; 123/58.7; 60/313
(58) Field of Search .................. 123/65 R, 73 R, 123/73 AE, 65 EM, 51 R, 65 E, 58.7, 52.5, 636, 59.7, 55.6, 55.7, 182.1, 51 B, 51 BA, 51 BC; 60/312, 313, 314; 181/249, 255, 264; 440/89

(56) References Cited

U.S. PATENT DOCUMENTS

| | | | | |
|---|---|---|---|---|
| 700,785 A | * | 5/1902 | Kull ........................ 181/239 |
| 1,290,925 A | * | 1/1919 | Albertis ................... 123/52.5 |
| 1,473,486 A | * | 11/1923 | McCallen ................ 123/52.5 |
| 1,513,311 A | * | 10/1924 | Burtnett .................. 123/51 B |
| 1,514,197 A | * | 11/1924 | Burtnett .................. 123/51 B |
| 1,596,401 A | * | 8/1926 | Burtnett .................. 123/51 B |
| 1,794,276 A | | 2/1931 | Bowes |
| 2,106,427 A | | 1/1938 | Hansson |
| 2,512,823 A | | 6/1950 | Blundell |
| 2,529,136 A | * | 11/1950 | Carlson ................... 181/255 |
| 2,542,756 A | | 2/1951 | Draminsky |
| 2,660,256 A | | 11/1953 | Walker |
| 2,788,078 A | * | 4/1957 | Reindl .................... 181/255 |
| 3,196,977 A | * | 7/1965 | Sanders .................. 181/256 |
| 3,786,791 A | * | 1/1974 | Richardson ............ 123/65 EM |
| 3,786,890 A | * | 1/1974 | Shank ..................... 180/309 |
| 3,794,008 A | * | 2/1974 | Mathews ................ 123/638 |
| 4,046,219 A | * | 9/1977 | Shaikh ................... 181/211 |
| 4,075,980 A | * | 2/1978 | Anger .................... 123/1 R |
| 4,149,378 A | * | 4/1979 | Nakamura et al. ...... 60/293 |
| 4,226,298 A | | 10/1980 | Bancel et al. |
| 4,325,460 A | | 4/1982 | Hoppenstedt |
| 4,369,741 A | * | 1/1983 | Perrin .................... 123/182.1 |
| 4,413,705 A | * | 11/1983 | Inaga et al. ............ 181/240 |
| 4,449,608 A | * | 5/1984 | Hirata et al. ........... 181/228 |

(List continued on next page.)

FOREIGN PATENT DOCUMENTS

| | | | |
|---|---|---|---|
| DE | 3902051 | * | 8/1990 |
| GB | 316369 | | 8/1929 |
| WO | WO 91/12422 | | 8/1991 |

OTHER PUBLICATIONS

US 6,273,014, 08/2001, Suzuki (withdrawn)*

Primary Examiner—Tony M. Argenbright
Assistant Examiner—Hai Huynh
(74) Attorney, Agent, or Firm—Knobbe, Martens, Olson & Bear, LLP

(57) ABSTRACT

An improved two stroke, multiple cylinder engine having combustion chambers and a single exhaust conduit for discharging exhaust gasses from the combustion chambers. In accordance with one feature of the invention, the combustion chambers are unified to two groups and respective combustion chambers belonging to the same group are generally simultaneously fired by a firing system. Otherwise, the entire combustion chambers are generally simultaneously fired. In accordance with another feature, the exhaust conduit has an attenuation mechanism for positive pressure reflection waves generated in the exhaust conduit. In a preferred embodiment, the attenuation mechanism comprises an inner pipe tapered downstream and having a plurality of apertures.

32 Claims, 11 Drawing Sheets

U.S. PATENT DOCUMENTS

| | | | | |
|---|---|---|---|---|
| 4,503,816 A | * | 3/1985 | Gijbels et al. | 123/52.4 |
| 4,539,813 A | * | 9/1985 | Tomita et al. | 60/314 |
| 4,909,034 A | * | 3/1990 | Kakuta | 60/324 |
| 4,940,026 A | * | 7/1990 | Fisher | 123/55.4 |
| 4,969,537 A | | 11/1990 | Wagner et al. | |
| 4,979,587 A | * | 12/1990 | Hirt et al. | 181/213 |
| 5,007,391 A | * | 4/1991 | Nomoto | 123/182.1 |
| 5,010,731 A | * | 4/1991 | Onishi | 60/313 |
| 5,044,159 A | | 9/1991 | Landfahrer et al. | |
| 5,050,378 A | | 9/1991 | Clemmens | |
| 5,152,255 A | | 10/1992 | Fukuda | 123/41.33 |
| 5,173,576 A | * | 12/1992 | Feuling | 181/247 |
| 5,189,993 A | * | 3/1993 | Schneider | 123/534 |
| 5,214,254 A | | 5/1993 | Sheehan | |
| 5,220,789 A | * | 6/1993 | Riley et al. | 60/302 |
| 5,246,473 A | | 9/1993 | Harris | |
| 5,251,718 A | | 10/1993 | Inagawa et al. | 180/190 |
| 5,351,483 A | * | 10/1994 | Riley et al. | 60/274 |
| 5,608,194 A | * | 3/1997 | Okazaki et al. | 181/228 |
| 5,615,554 A | | 4/1997 | Gobert | |
| 5,662,073 A | | 9/1997 | Tanaka | |
| 5,785,027 A | | 7/1998 | Chabry | |
| 5,862,662 A | * | 1/1999 | Fukuda et al. | 60/313 |
| 5,902,970 A | * | 5/1999 | Ferri | 181/249 |
| 5,911,608 A | * | 6/1999 | Nakayama et al. | 440/89 |
| 5,957,230 A | | 9/1999 | Harano et al. | 180/68.4 |
| 6,000,370 A | * | 12/1999 | Rickard | 123/182.1 |
| 6,106,344 A | * | 8/2000 | Mashiko | 440/89 |
| 6,155,896 A | * | 12/2000 | Suzuki | 440/89 |
| 6,158,546 A | * | 12/2000 | Hanson et al. | 181/255 |
| 6,220,387 B1 | * | 4/2001 | Hoppes et al. | 181/259 |

* cited by examiner (Crankshaft Rotation Angle)

TWO STROKE, MULTIPLE CYLINDER ENGINE FOR SMALL VEHICLE

BACKGROUND OF THE INVENTION

1. Field of the Invention

This invention relates to a two stroke, multiple cylinder engine and more particularly to an improved two stroke, multiple cylinder engine most suitable to a small vehicle such as a snowmobile.

2. Description of Related Art

Snowmobiles are powered by internal combustion engines, particularly by two stroke, multiple cylinder engines. Usually, three cylinder engines are utilized because they allow easy choice of diameter for the cylinder bores without abnormal combustion despite having relatively large displacements. These engines have combustion chambers that are fired at intervals 120 degrees of crankshaft rotation angle relative to each other.

Preferably, an exhaust system for the engine has three separate exhaust conduits each allotted to a respective cylinder so as to utilize exhaust pulsation waves. Because the utilization of the exhaust pulsation waves is generally desirable for two stroke engines in progressing the charging efficiency of intake charges. That is, the negative pressure component of the exhaust pulsation wave contributes improvement of the delivery ratio that is one factor of the charging efficiency, while the positive pressure component of the same pulsation wave contributes improvement of the trapping efficiency of intake charges, that is another factor of the charging efficiency.

However, a snowmobile may allot relatively small and restricted space for components of the engine. Due to this restriction, usually such three separate exhaust conduits can not be accommodated. A single exhaust conduit is utilized instead of the three separate exhaust conduits. This single exhaust conduit can bring in lightening as well as minimization of the exhaust system and eventually those of the engine per se.

In the meantime, however, another problem arises in this arrangement. The aforenoted exhaust pulsation waves produced in each cylinder exert influence on the other cylinders. This influence is generally undesirable because the waveforms produced in other cylinders are different from the waveform that the certain cylinder requires and rather harmful. Particularly, the positive pressure component of the exhaust pulsation wave will prevent exhaust gasses from being discharged smoothly. Because of this, the charging efficiency of intake charges deteriorates and eventually invites deterioration in engine power and fuel efficiency.

It is, therefore, a principal object of this invention to provide an improved two stroke, multiple cylinder engine whereby minimization and lightening of an exhaust system will be realized without any deterioration in engine power and fuel efficiency.

It is another object to provide a two stroke, multiple cylinder engine whereby respective exhaust pulsation waves do not affect any undesirable influence on the other cylinders even though exhaust gasses are collected with a single exhaust conduit.

It is a further object to provide a two stroke, multiple cylinder engine whereby the positive pressure component of exhaust pulsation waves can be effectively removed or reduced.

SUMMARY OF THE INVENTION

In accordance with one aspect of this invention, a two stroke crankcase compression internal combustion engine has more than two combustion chambers for burning air fuel mixtures therein. A firing system is provided for firing the respective air fuel mixtures in the combustion chambers. An exhaust system is also provided for discharging exhaust gasses from the combustion chambers. The exhaust system has a single exhaust conduit collecting the exhaust gasses. The combustion chambers are unified to two groups. Respective combustion chambers belonging to the same group are fired generally simultaneously by means of the firing system.

In accordance with another aspect of this invention, a two stroke crankcase compression internal combustion engine has at least two combustion chambers for burning air fuel mixtures therein. A firing system is provided for firing the respective air fuel mixtures in the combustion chambers. An exhaust system is also provided for discharging the exhaust gasses from the combustion chambers. The exhaust system has a single exhaust conduit collecting the exhaust gasses. The combustion chambers are fired generally simultaneously by means of the firing system.

In accordance with a further aspect of this invention, a two stroke crankcase compression internal combustion engine has at least two combustion chambers for burning air fuel mixtures therein. An exhaust system is provided for discharging exhaust gasses from the combustion chambers. The exhaust system has a single exhaust conduit collecting the exhaust gasses. An attenuation mechanism is also provided for attenuating positive pressure reflection waves generated in the exhaust conduit.

In accordance with a still further aspect of this invention, a method is featured for firing a two stroke crankcase compression internal combustion engine. The engine has at least two combustion chambers for burning air fuel mixtures therein. An exhaust system is provided for discharging exhaust gasses from the combustion chambers. The exhaust system has a single exhaust conduit collecting the exhaust gasses. The method comprises the steps for firing some of the combustion chambers generally simultaneously and firing the rest of the combustion chambers generally simultaneously at a different timing relative to the firing at the fired group.

Further aspects, features and advantages of this invention will become apparent from the detailed description of the preferred embodiments which follow.

BRIEF DESCRIPTION OF THE DRAWINGS

The drawings of preferred embodiments are intended to illustrate, but not to limit, this invention.

DETAILED DESCRIPTION OF THE PREFERRED EMBODIMENTS OF THE INVENTION

The present two stroke, multiple internal combustion engine has particular utility with snowmobiles, and thus, the following describes such an engine in the context of an exemplary snowmobile. This environment of use, however, should be considered exemplary. The present engine can be put into practice by those skilled in the art with other types of small vehicles as well, such as golf carts and personal watercrafts.

Figure 1:
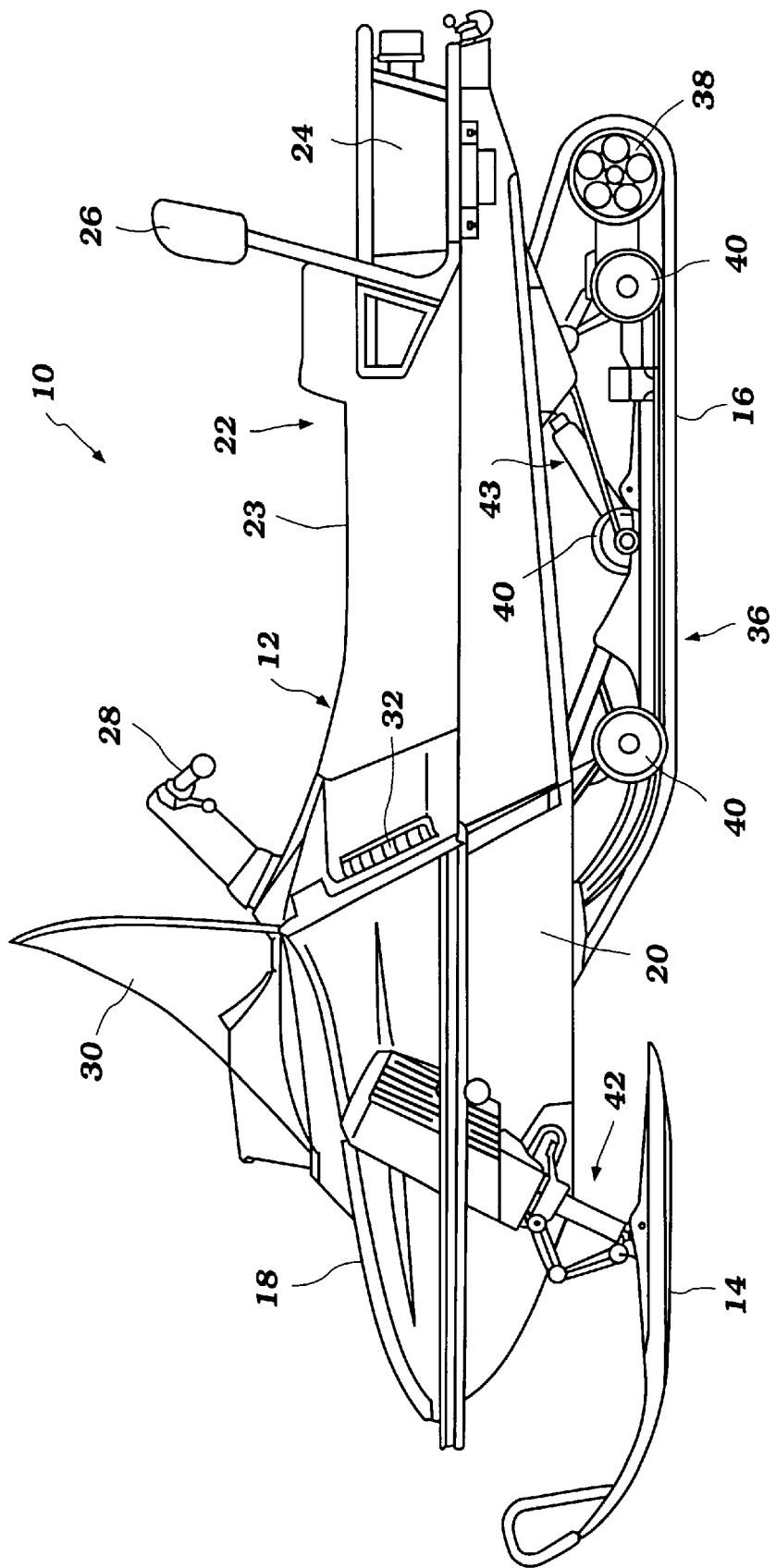
FIG. 1 is a side elevational view showing a snowmobile which is equipped with a two stroke, three cylinder engine embodying features of this invention.
Figure 2:
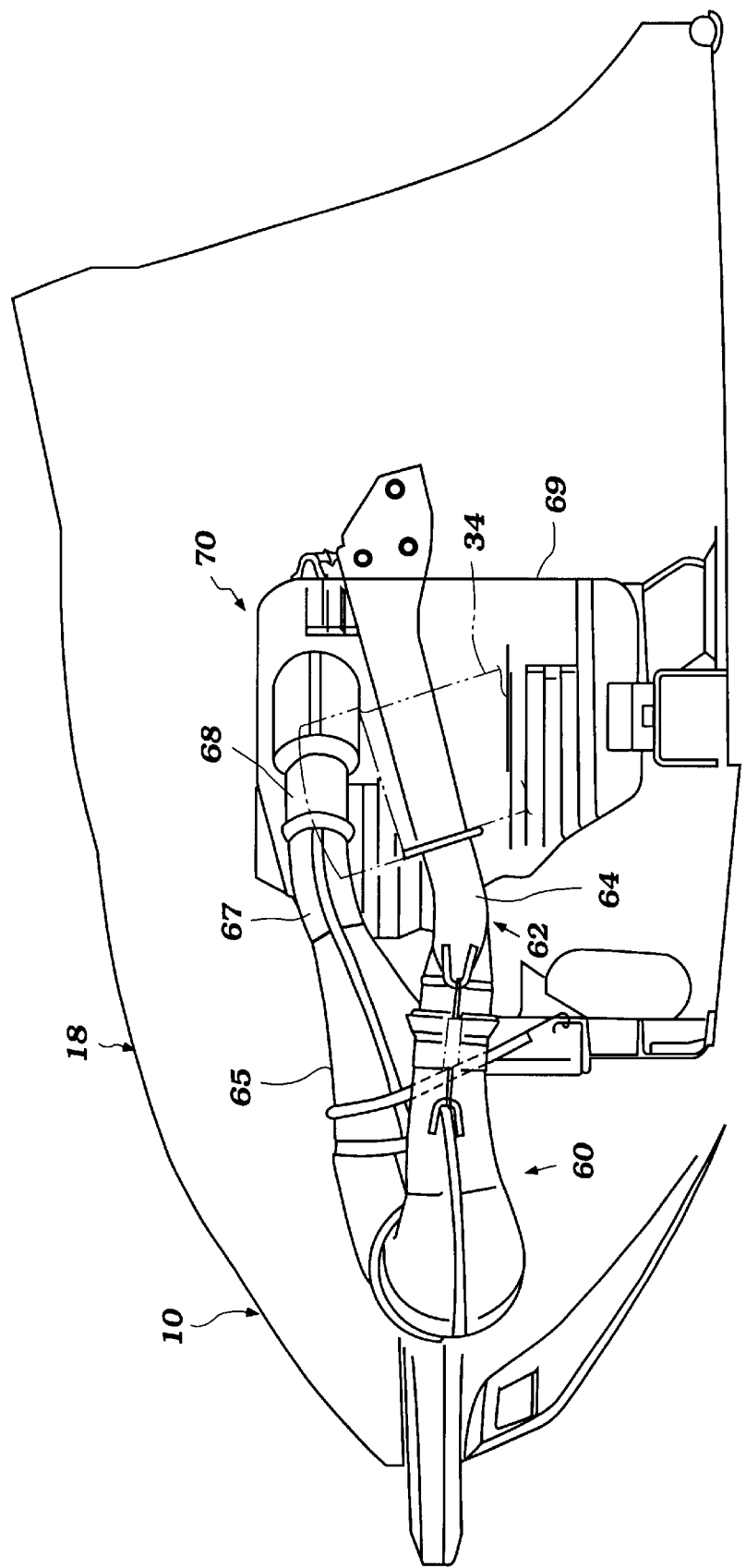
FIG. 2 is a partial elevational view of the same snowmobile to show the engine and engine components, particularly an exhaust system, in a see-through manner. The engine is indicated schematically in phantom.
Figure 3:
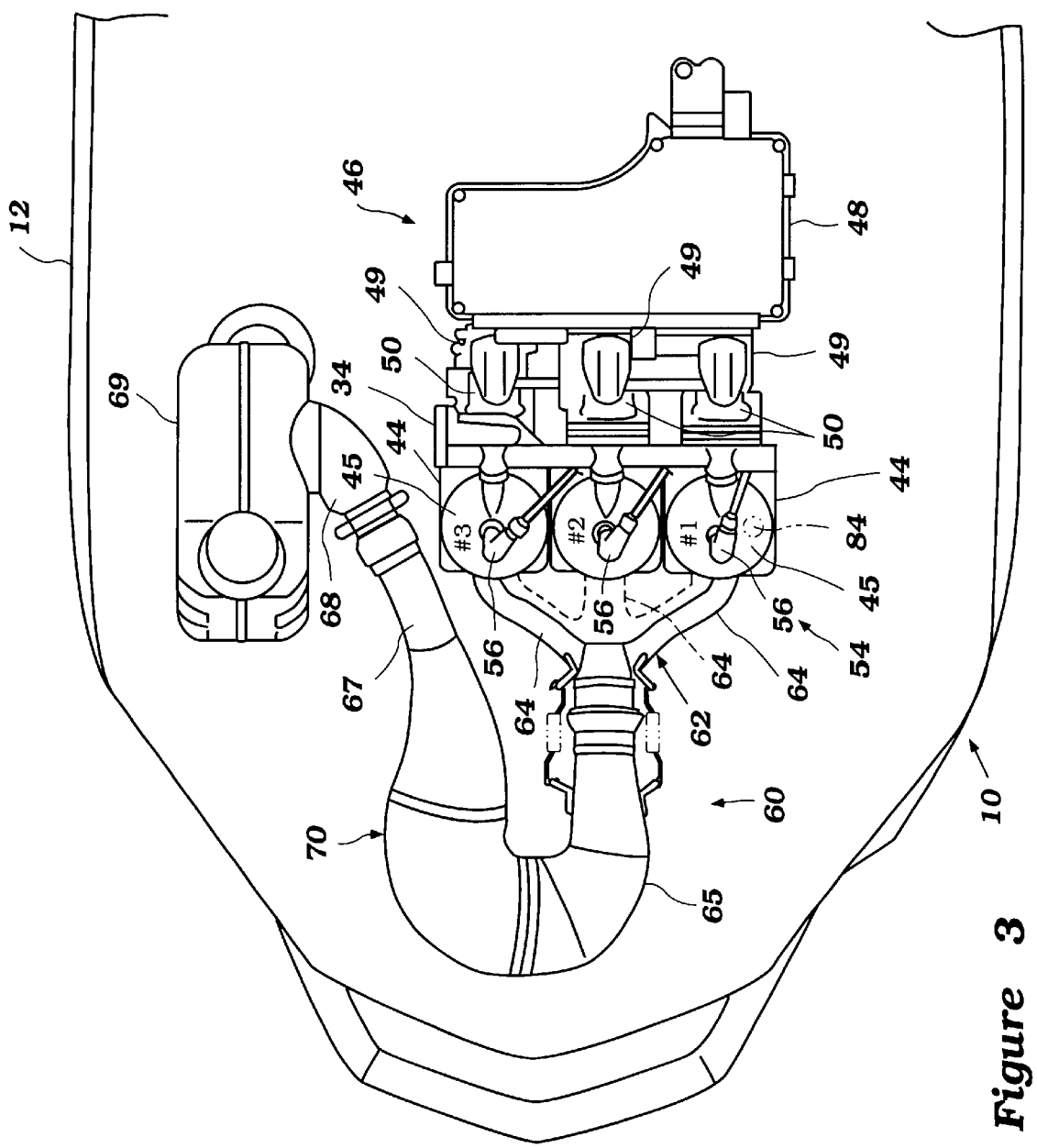
FIG. 3 is a partial plan view showing of the same snowmobile to show the engine and the engine components also in the same see-through manner.

With reference to FIGS. 1 through 3, an exemplary snowmobile, indicated generally by the reference numeral 10, and an arrangement for engine components will be described.

FIG. 1 illustrates a side elevational view of the snowmobile 10 which is equipped with a two stroke, three cylinder engine embodying features of this invention. FIG. 2 illustrates a partial elevational view of the same snowmobile to show the engine and engine components, particularly an exhaust system, in a see-through manner. The engine is indicated schematically in phantom. FIG. 3 illustrates a partial plan view of the same snowmobile to show the engine and the engine components also in the same see-through manner.

The snowmobile 10 generally comprises a body 12 that is supported at a forward portion by a pair of front skies 14 and is driven from a rear portion by a track 16. The body 12 generally includes a front shroud 18, a belly pan 20, a seat assembly 22 and a carrier assembly 24. The seat assembly 22 has a longitudinally extending straddle-type seat 23 and a backrest 26 placed at the rearmost portion of the seat 23. A steering handle 28 is positioned in front of the seat assembly 22. The steering handle 28 may be linked in any suitable manner to the front skis 14 and movement of the steering handle 28 results in corresponding movement of the front skies 14 as is known. A windshield 30 is provided between the front shroud 18 and the steering handle 28 to protect a rider or riders from snow and/or wind impinging upon them. Air vents 32 are placed on both sides of the body 12 to introduce air into an engine compartment (not shown) which is formed under the front shroud 18.

An internal combustion engine 34 is disposed in the engine compartment and supported with a plurality of elastic members or mount rubbers (not shown). The engine 34 powers the track 16 through a power transmission system (not shown) and a drive mechanism 36. The track 16 is wound around the drive mechanism 36 that includes a drive wheel (not shown), a driven wheel 38 and idler wheels 40. The engine output is transferred to the power transmission system including, for example, a V-belt type auto transmission device and then the power transmission system drives the drive wheel of the drive mechanism 36.

Suitable shock absorbers 42, 43 are employed for holding the skies 14 and the drive mechanism 36, respectively.

The engine 34, as best seen in FIG. 3, is operated on a two stroke crankcase compression principle and has three cylinders #1,2,3 disposed in line transversely relative to the longitudinal axis of the body 12 of the snowmobile 10. Each cylinder #1,2,3 generally comprises a cylinder block 44 wherein a cylinder bore is formed, cylinder head 45 and a crankcase (not shown). A combustion chamber is generally defined by the cylinder bore, a piston reciprocating therethrough and a cylinder head 45. An air fuel mixture is formed in the combustion chamber through an air induction system 46 and a fuel supply system (not shown) and burnt therein. With this burning of the mixture, huge power is created and move the piston downwardly and this power is outputted through a crankshaft 47 (see FIG. 4), which will be described later, rotated by the reciprocal movement of the piston. This combustion principle is well known and no further description seems to be necessary. The engine 34 will be described more in detail with reference to FIGS. 4 and 5 below.

An air chamber or air silencer 48, which is generally shaped as a rectangular box, is placed rearward of the engine 34. The air chamber 48 is connected to the respective cylinders #1,2,3 of the engine 34 through three intake ducts 49 and carburetors 50. The air chamber 48, intake ducts 49 and the carburetors 50 generally form the aforenoted air induction system 46. The carburetors 50 also form a part of the fuel supply system which includes a fuel supply tank (not shown) placed under the front shroud 18 or at any other place in the body 12.

A firing system 54 is provided for firing air fuel mixtures in the combustion chambers. The firing system 54 includes spark plugs 56, a battery and a control device. The spark plugs 56 are affixed on the cylinder heads 46 so that their firing electrodes are exposed to the combustion chambers and fired at predetermined intervals by the control device. Firing energy is supplied by the battery. This firing system 54 is also well known and thus no further description seems to be necessary to permit those skilled in the art to understand or practice this invention.

An exhaust system 60 is also provided for the engine 34, more specifically, for discharging burnt charges, i.e., exhaust gasses from the combustion chambers. The exhaust system 60 comprises an exhaust manifold 62 to collect exhaust gasses from respective combustion chambers and hence has three exhaust passages 64 therein. The exhaust manifold 62 extends forwardly from the engine 34. The exhaust system 60 further comprises an exhaust duct 65 which forms an expansion chamber to reduce exhaust energy in the exhaust gasses and finally muffle exhaust noise. The exhaust duct 65 extends forwardly from the exhaust manifold 62 and turns rearwardly. The exhaust system 60 further has a tail pipe 67 and an elastic coupling 68 continuing the tail pipe 67. The exhaust system 60 completes an exhaust silencer 69 located aside of the engine 34. The tail pipe 67 is connected to the exhaust silencer 69 via the elastic coupling 68. The exhaust silencer 69 is generally shaped as a rectangular box like the air silencer 48 and reduces the exhaust noise further. The part of the exhaust manifold 62 where the exhaust passages 64 are gathered together, the exhaust duct 65, the tail pipe 67, the elastic coupling 68 and the exhaust silencer 69 generally define a single exhaust conduit 70.

Figure 4:
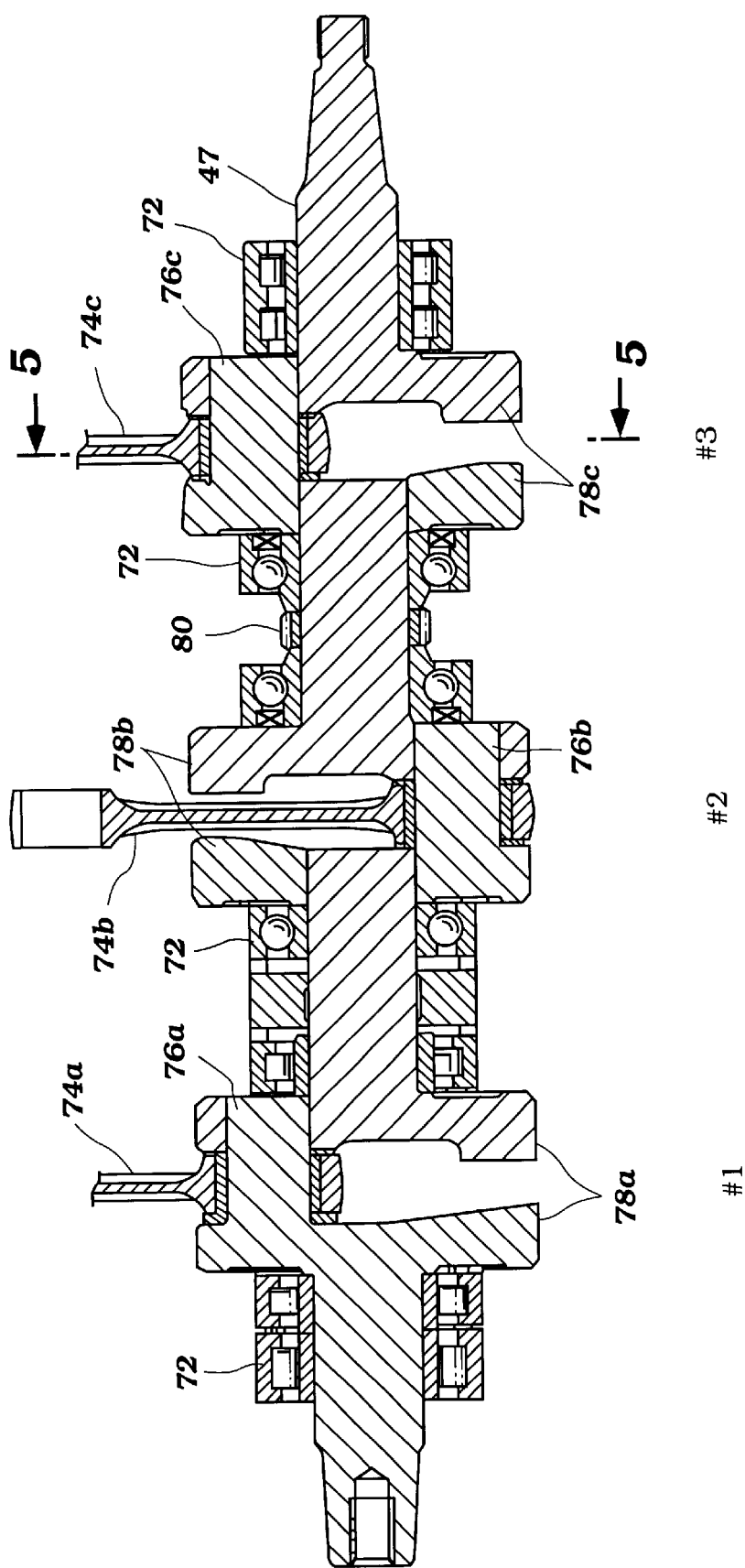
FIG. 4 is an enlarged cross-sectional view showing partially engine components including a crankshaft.
Figure 5:
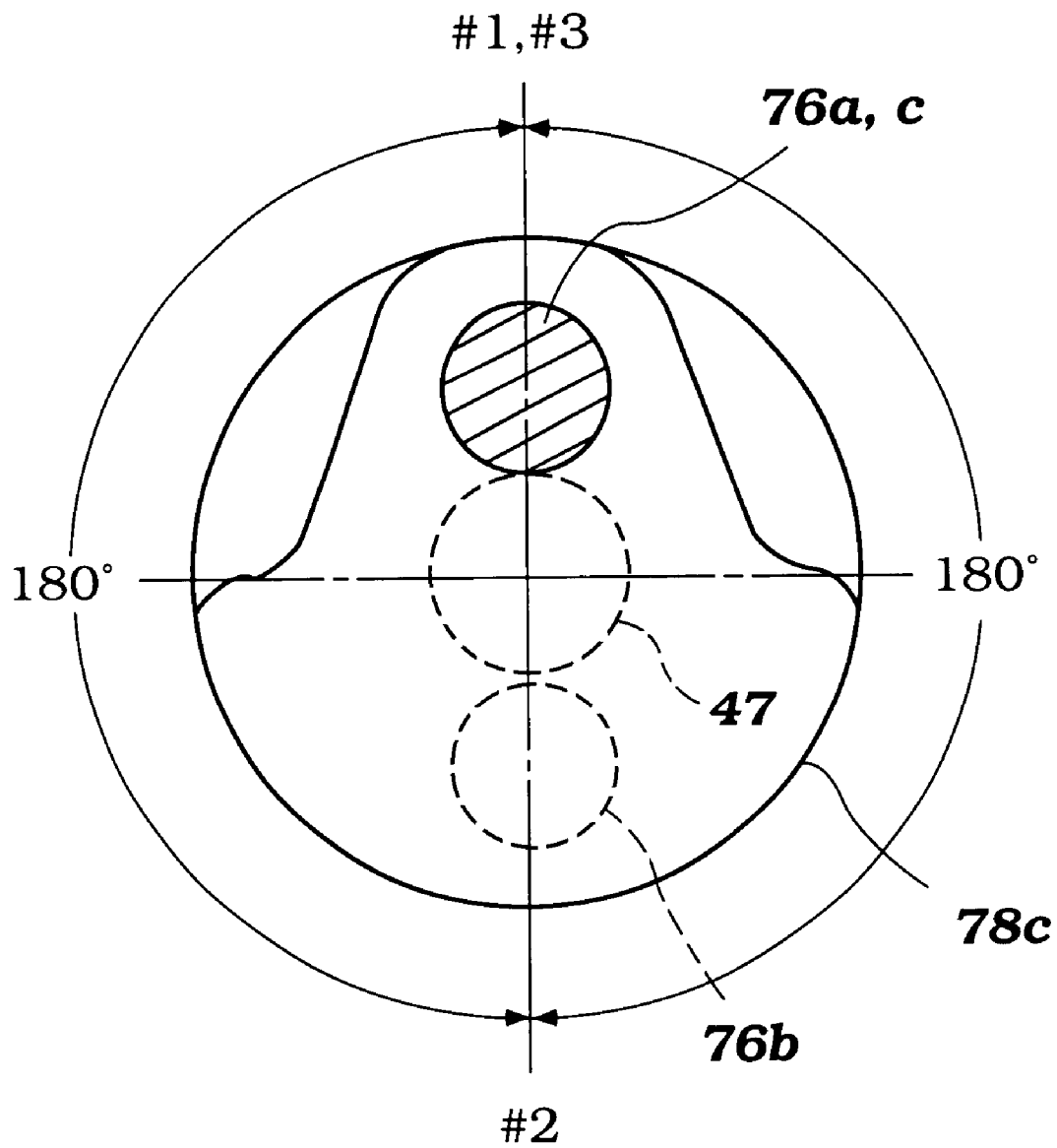
FIG. 5 is a cross-sectional view of the engine components taken along the line 5—5 in FIG. 4 and also shows the relationships between respective cylinders in connection with crankshaft rotation angles.

FIG. 4 illustrates an enlarged cross-sectional view showing partially engine components including the crankshaft 47. FIG. 5 illustrates a cross-sectional view of the engine components taken along the line 5—5 in FIG. 4 and also shows the relationships between respective cylinders #1,2,3 in connection with crankshaft rotation angles.

The crankshaft 47 is rotatably journaled by bearings 72 in a crankcase of the engine 34. Three connecting rods 74a,b,c are also rotatably connected at crank pins 76a,b,c of the crankshaft 47. Throws 78a,b,c are formed at the other sides of the crank pins 76a,b,c. The aforenoted pistons are rotably connected to the other ends of the connecting rods 74a,b,c. Thus, with the reciprocating movements of the pistons, the crankshaft 47 is rotated. An output gear 80 is affixed on the crankshaft 47 and hence rotation of the crankshaft 80 is transmitted via the output gear 80 to the aforenoted power transmission system.

As is well known in the two stroke crankcase compression principle, the burnt charge (exhaust gasses) rushes out to the exhaust system 60 when exhaust ports are uncovered. At the same time, new air fuel mixture or new intake charge compressed in a crankcase before is transferred to the combustion chambers through scavenging passages. With this transfer of the new intake charge, the burnt charge (exhaust gasses) is completely expelled to the exhaust system 60. The flow of the exhaust gasses generally produces the negative pressure pulsation wave in the exhaust system 60 and this negative pressure pulls the new charge into the combustion chambers as well as expedites the discharge of the exhaust gasses. In the meantime, the positive pressure pulsation wave will be produced in the exhaust system 60 when negative pressure pulsation wave confronts a portion which capacity is shrunk or they are impeded from moving. The positive pressure pulsation wave is reflected to the exhaust ports to prevent the new charge from escaping. Generally, the negative pressure component contributes to improvement of the delivery ratio, while the positive pressure contributes to improvement of the trapping efficiency. Thus, if the engine would have only a single cylinder, the exhaust pulsation wave including the negative and positive pressure components were quite effective.

However, if the engine has three cylinders which are fired at intervals of 120 degrees in crankshaft rotation angles relative to each other cylinder and also a single collected exhaust conduit like the engine 34, then it has the aforenoted problem that each exhaust pulsation wave in one cylinder influences the other cylinders. Because when the exhaust ports of one cylinder starts to open, the exhaust ports of another cylinder still opens. In other words, although the exhaust ports of one cylinder still opens, the exhaust ports of another cylinder starts to open.

In order to improve this situation, as seen in FIGS. 4 and 5, the crank pins 76a,c for the cylinders #1 and #3 are disposed at the same angle relative to each other on the crankshaft 47. Meanwhile, the other crank pin 76b for the cylinder #2 is disposed at opposite side on the crankshaft 47 relative to the other crank pins 76a,c. That is, it is positioned on the crankshaft 47 with the phase difference 180 degrees relative to the crank pins 76a,c.

Because of the arrangement described above, when the pistons in the cylinders, #1 and #3 are at each Top Dead Center, the piston in the cylinder #2 is at its Bottom Dead Center and vice versa. Also, the cylinders #1 and #3 are fired by the spark plugs 56 of the firing system 54 simultaneously, while the cylinder #2 is fired at intervals of 180 degrees in crankshaft rotation angle relative to the cylinders #1 and #3.

Further, when the exhaust ports of the cylinders #1 and #3 are opened, the exhaust ports of the other cylinder #2 is closed and when the exhaust ports of the cylinders #2 is opened, the exhaust ports of the cylinders #1 and #3 are closed. That is, the open and close timings of the both unified groups do not overlap with each other group.

Generally describing, in accordance with a feature of the invention, cylinders are unified to two groups and cylinders belonging to the same group are fired generally simultaneously. Each firing timing of the group is different relative to each other group generally maximum. Thus, exhaust pulsation waves in one group will not affect any undesirable influence on the other group even though exhaust gasses are collected by a single exhaust conduit.

It seems to be apparent to those skilled in the art that, as a variation, another arrangement wherein the entire crank pins 76a,b,c for all cylinders #1,2,3 are disposed at the same angle on the crankshaft 47 and fired simultaneously can bring in the same advantage.

Since two or all of the cylinders are unified and hence pressure in the combustion chambers at the compression stroke is very high, a starting of the engine 34 may be difficult. As shown in FIG. 3, a decompression mechanism 84 is provided on the cylinder head 45 of the cylinder #1 for improving this situation. Any conventional decompression mechanism is applicable and some mechanism may be placed on the cylinder block 44.

Figure 6:
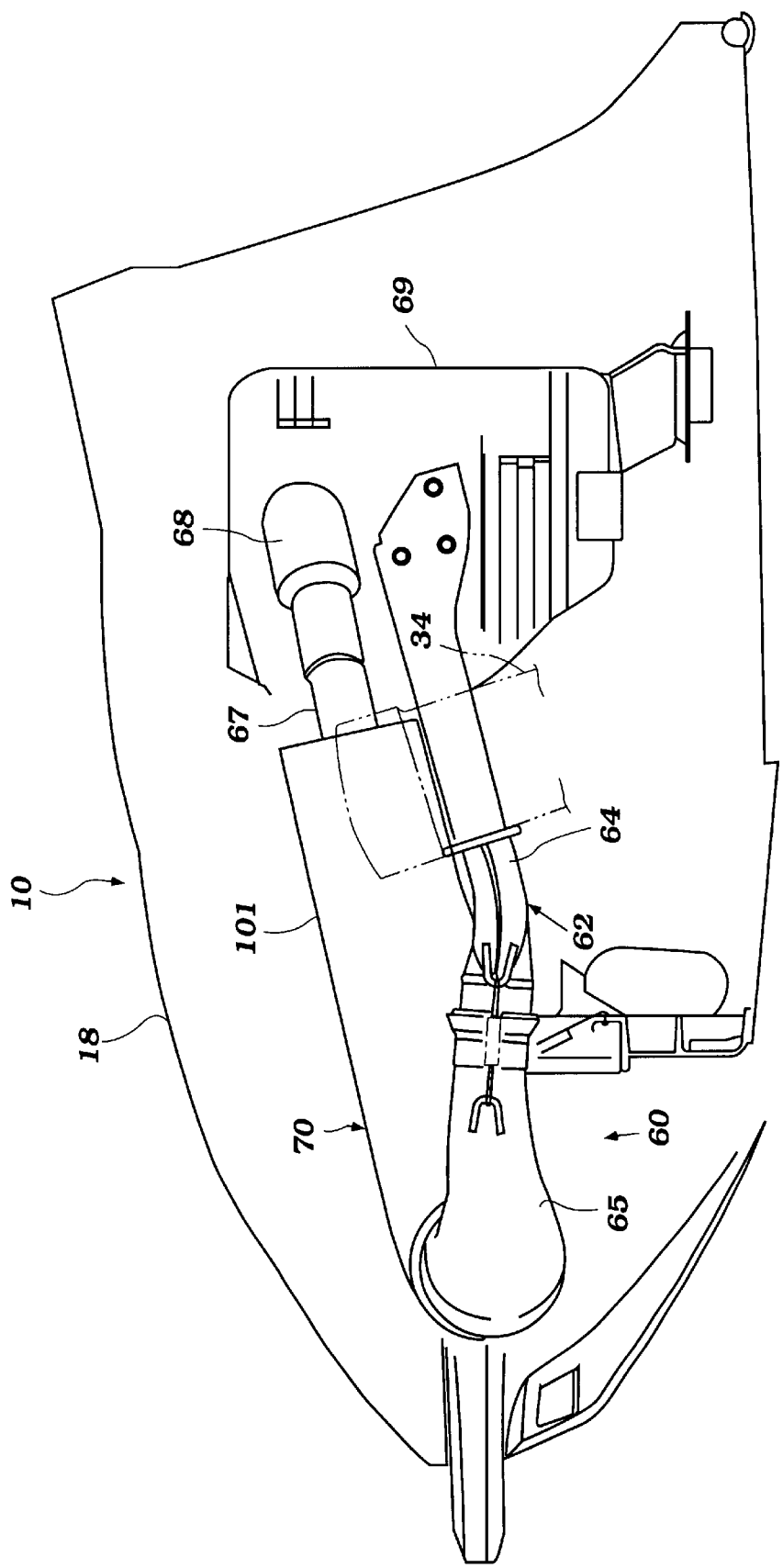
FIG. 6 is a partial elevational view showing a snowmobile embodying another feature of this embodiment.
Figure 7:
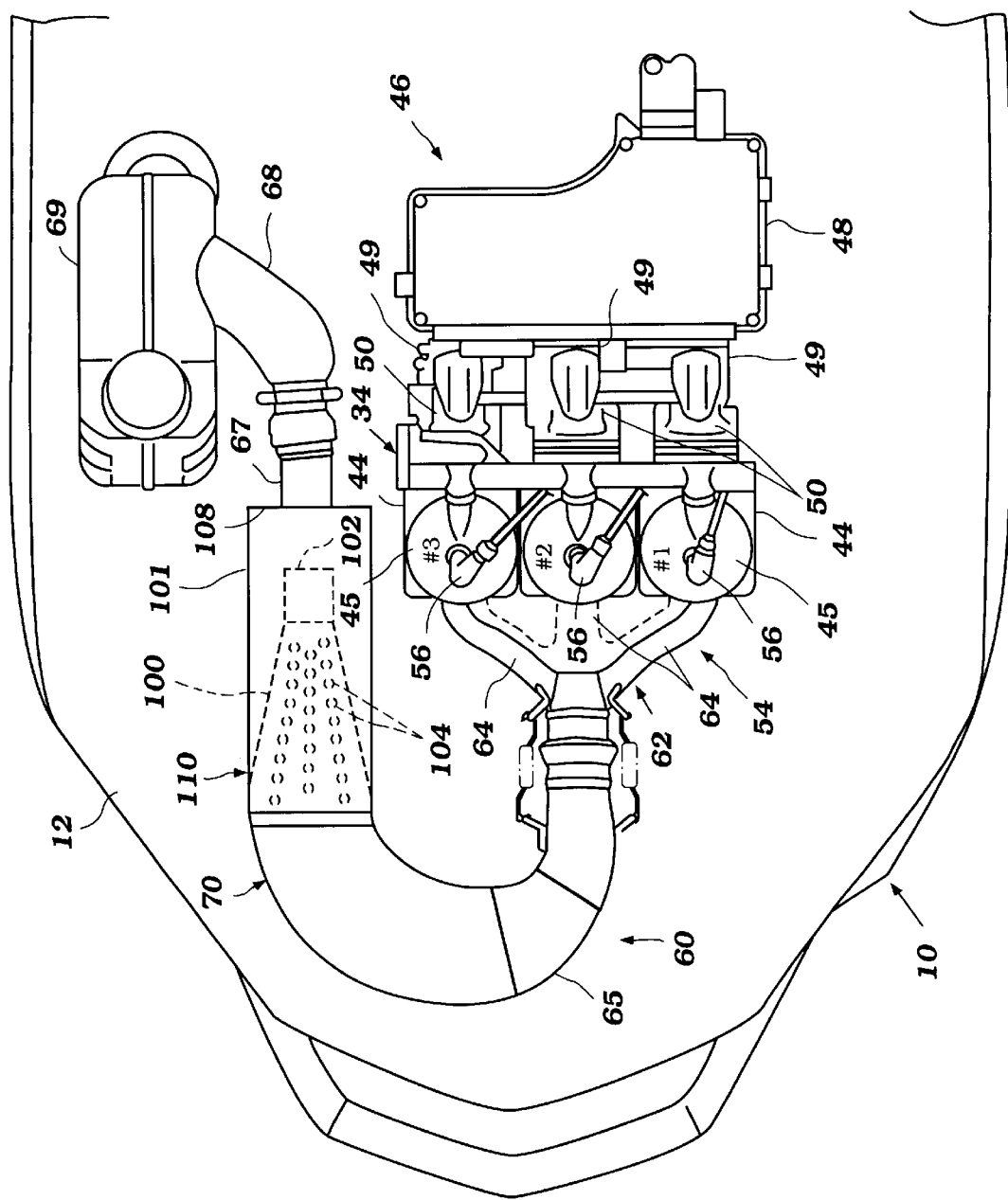
FIG. 7 is a partial plan view showing the same snowmobile.

FIGS. 6 and 7 show another embodiment in accordance with another feature of the invention. FIG. 6 illustrates a partial elevational view of a snowmobile embodying this feature. FIG. 7 illustrates a partial plan view of the same snowmobile. The same components or members as described in connection with the arrangement illustrated in FIGS. 1 through 5 are assigned with the same reference numerals so as to avoid redundancy. The other embodiments following this embodiment will be the same.

The exhaust system 60 in this embodiment is intended to remove or reduce the positive pressure component in the exhaust pulsation waves that reflected downstream in the exhaust system 60. In this regard, the term "positive pressure component" means the pressure component that has a vector against the flow of the exhaust gasses. This positive pressure component prevents exhaust gasses from being discharged smoothly. Generally, the positive pressure component is generated in a convergent cone shape that is tapered downstream when the negative pressure component, which is the pressure component along the flow of the exhaust gasses, is reflected at the portion such as shaped.

Figure 11:
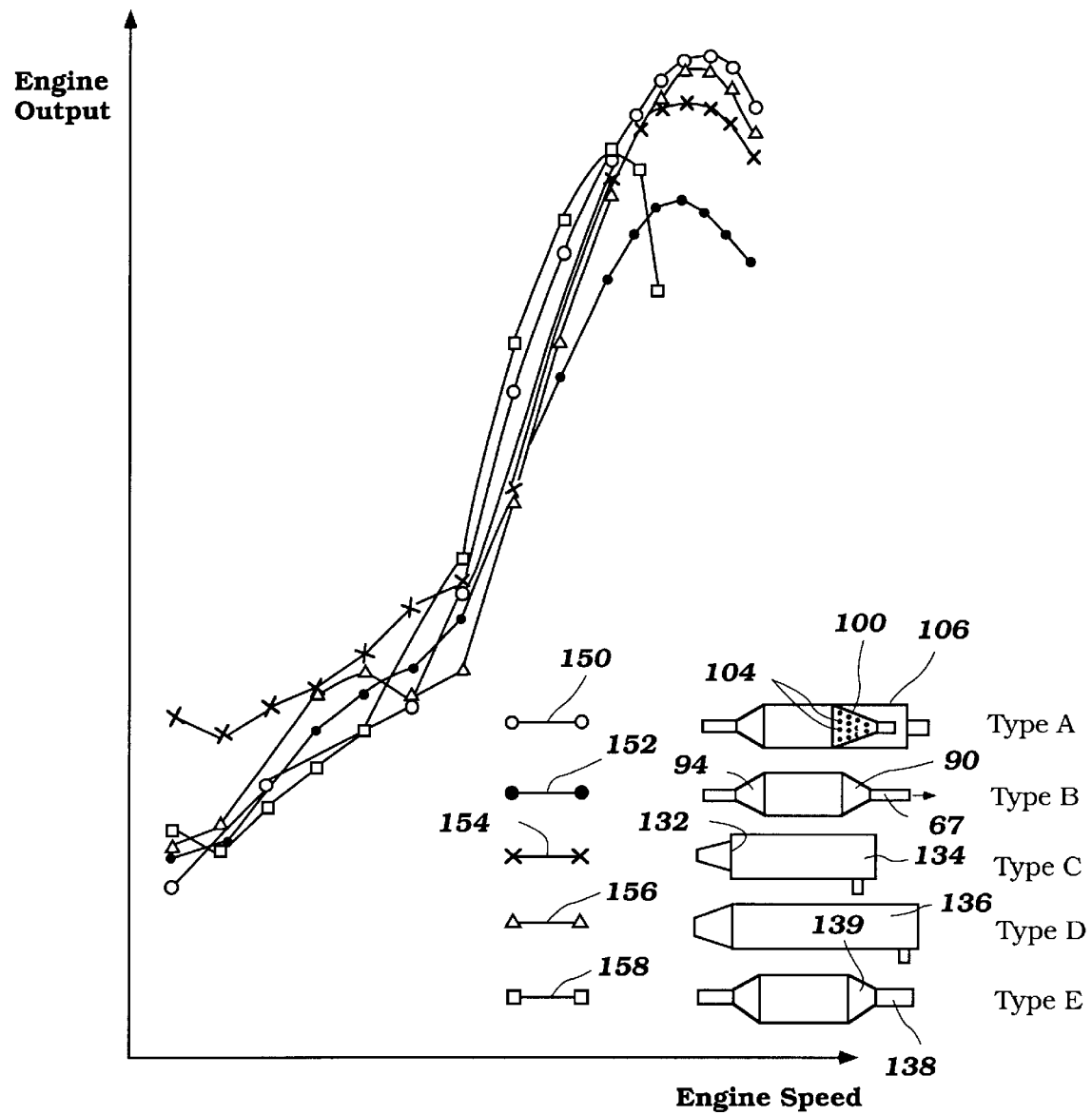
FIG. 11 is a graphical view showing characteristics of various types of the exhaust conduit in connection with engine outputs versus engine speeds. The various types of the exhaust conduit are schematically illustrated at the lower right-hand side of this figure.

FIG. 11 shows schematically several types of the exhaust conduit at the lower right-hand side. The type B is a conventional one. Exhaust gasses pass through it from left to right in this figure. The flow of the exhaust gasses that rushes downstream makes essentially a negative pressure pulsation wave. The portion indicated with the reference number 90 is the convergent cone shape. This convergent cone portion 90 is a barrier against the flow of the exhaust gasses because it impedes the flow and the negative pressure pulsation wave is reflected to generate the positive pressure pulsation wave. If this portion 90 is straight and connected to the tail pipe 67 that is shrunk in capacity, the positive pressure wave is also generated. Incidentally, the portion indicated with the reference numeral 94 is a divergent cone shape that amplifies the negative pressure wave.

Returning to FIGS. 6 and 7, a convergent cone or tapered pipe 100 is provided immediately downstream of the exhaust duct 65 and contained in an outer chamber 101. The downstream end 102 of the tapered pipe 100 is opened so that exhaust gasses are allowed to pass through the opening end 102 and flow downstream. Thus, the tapered pipe 100 is an inner duct. The tapered pipe 100 has also a plurality of apertures 104 on them. The outer chamber 101 is connected to the exhaust silencer 69 via the tail pipe 67 and the elastic pipe 68.

The tapered pipe 100 may be a barrier of the flow of the exhaust gasses and it can reflect the negative pressure wave. The reflected pressure wave then will be the positive pressure wave as aforedescribed. However, it is not true with this tapered pipe 100 because the exhaust gasses are allowed to pass through the apertures 104 and hence the negative pressure wave is rarely reflected. Also, the end portion 108 of the outer chamber 101 may generate it. This is, however, hindered by the apertures 104 again and will scarcely go back upstream. Thus, the apertures 104 formed at the tapered pipe 100 act as an attenuation mechanism 110 for attenuating the positive pressure waves.

Figure 8:
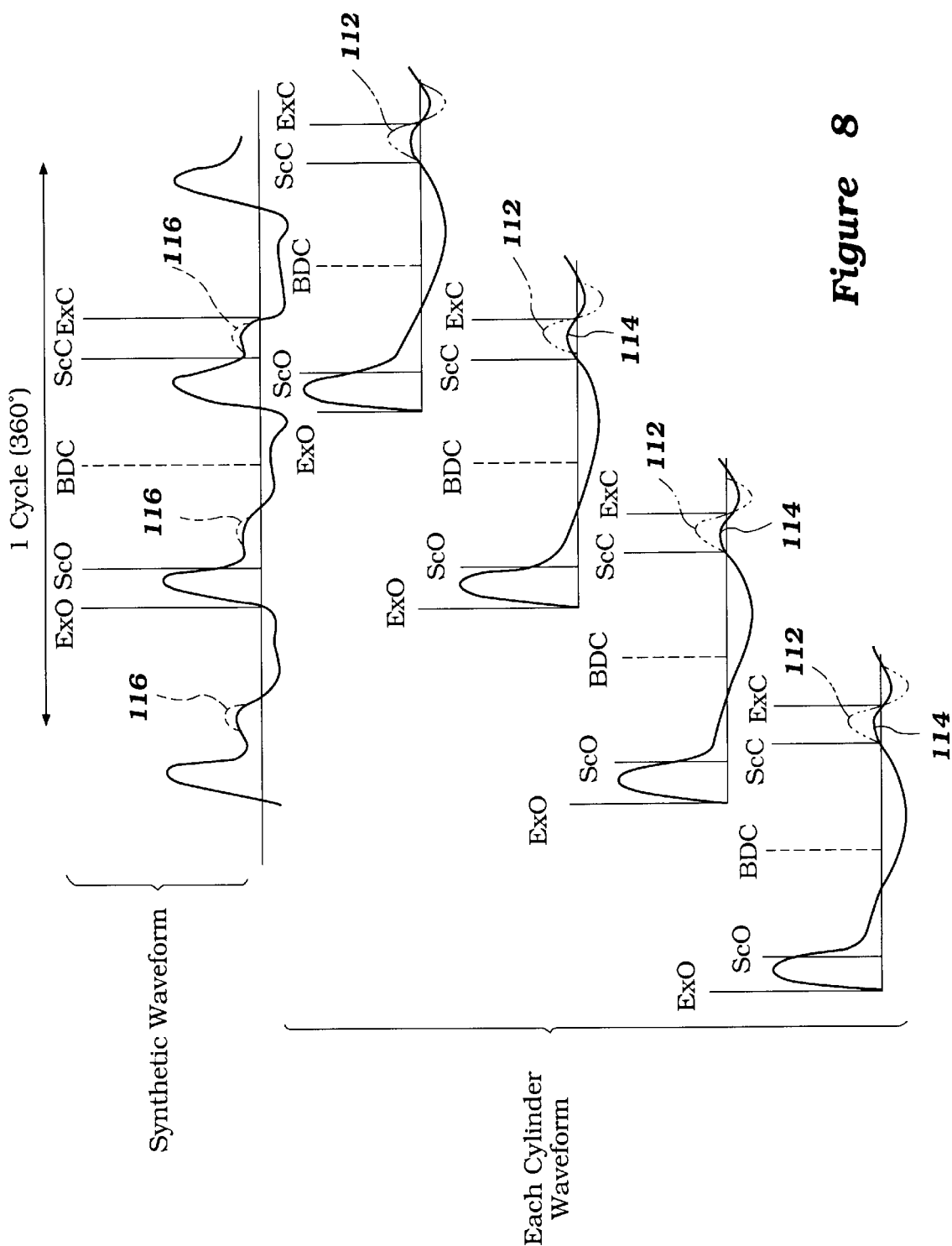
FIG. 8 is a graphical view showing waveforms of the exhaust pulsation waves. The four waveforms from the bottom indicate each waveform of the respective cylinders and the waveform at the top of them indicates a synthetic waveform made by unifying the waveforms in the cylinders.

FIG. 8 illustrates waveforms of the exhaust pulsation wave. The four waveforms from the bottom indicate each waveform of the respective cylinders #1,2,3 and the waveform at the top of them indicates a synthetic waveform made by unifying the waveforms in the cylinders #1,2,3. The respective cylinders #1,2,3 are fired at intervals of 120 degrees to each other.

First, in taking notice of one of the single waveforms, with the down movement of the piston, the exhaust ports are opened (ExO) and exhaust gasses vigorously flow out to the exhaust manifold 62 from the combustion chamber. The pressure in the exhaust system 60 is very high immediately after the exhaust ports are opened (ExO) and then drops down. Before long, the scavenge ports are opened (ScO) and the rest of the exhaust gasses are expelled from the combustion chamber by the new intake charge. The pressure continues going down and then turned to negative pressure because the continuing flow of the exhaust gasses. When the piston goes up after reached the Bottom Dead Center, the pressure will turn to increase but still be kept in negative until the scavenge ports are closed. When the scavenge ports are closed, the negative pressure does not remain any longer and rather the positive pressure that is reflected downstream appears.

If the attenuation mechanism 110 were not provided, the positive pressure would be relatively large as shown with the reference numeral 112 and in phantom line. However, because of having the attenuation mechanism 110, the positive pressure becomes very small as shown with the reference numeral 114 and in actual line. Accordingly, the synthetic waveform will not have the positive pressure 116 corresponding to the positive pressure 112.

In addition, conventionally and in a single cylinder or multiple cylinders with separate exhaust system, the positive pressure 112 is useful to prevent the new charge from going out from the combustion chamber, in other words, to keep it there. However, in this arrangement wherein the three cylinders are provided with a single exhaust system, when the positive pressure 112 is generated in one cylinder, the next cylinder is in the exhaust stroke (see the waveform immediately above). This positive pressure 112 could prevent the exhaust gasses in the other cylinder from flowing out smoothly, if there were no effective measure. However, as described above, the positive pressure in this embodiment is attenuated to be the shape 114. Thus, the problem with the positive pressure 112 no longer exists.

The structure described above is quite useful because it does not require large space. In addition, it is very much adjustable to a large variety of two stroke engines by only changing the number and/or the size of the apertures 104.

Figure 9:
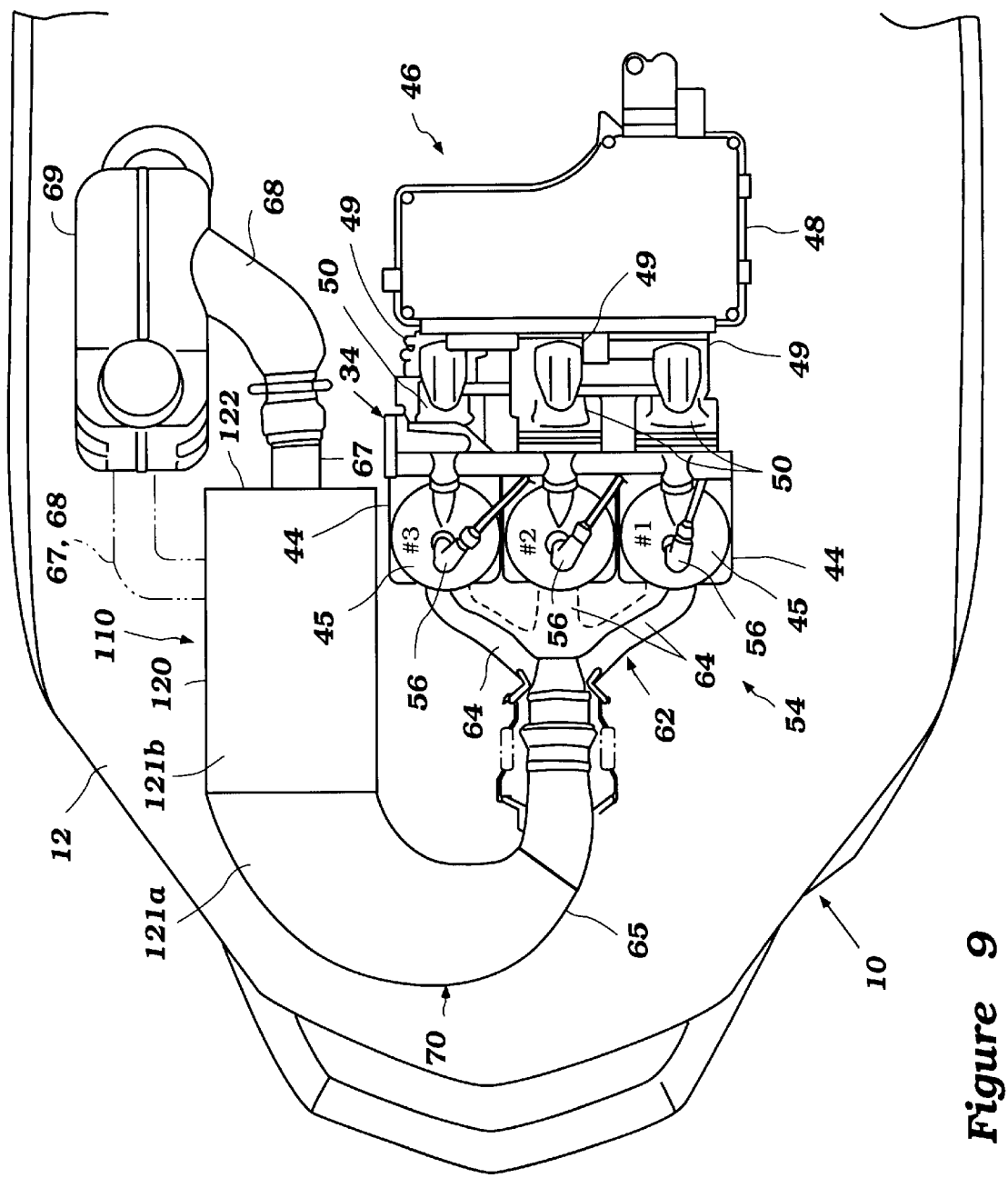
FIG. 9 is a partial plan view showing a snowmobile embodying another arrangement of an exhaust conduit.

If, however, there is sufficient space for the exhaust system 60, another arrangement shown in FIG. 9 is also useful.

In this embodiment, the exhaust duct 65 includes an exhaust expansion chamber 120 formed with a curved portion 121a and a straight or rectangular portion 121b. The curved portion 121a is expanded gradually downstream and connected to the straight portion 121b with the same diameter as that of the straight portion 121b. The tail pipe 67 is connected at the utmost downstream end portion 122 of the expansion chamber 120. The end portion 122 is a barrier of the exhaust gas flow in this arrangement and the positive pressure wave is generated (the negative pressure wave is reflected) there. This expansion chamber 120 has a relatively large volume. Because of this large volume, the positive pressure can be attenuated sufficiently. This volume is selected to be at least five times of the entire displacement of the three cylinders and preferably more than seven times thereof. The tail pipe 67 can be connected at the side wall of the straight portion 121b as shown in phantom.

Figure 10:
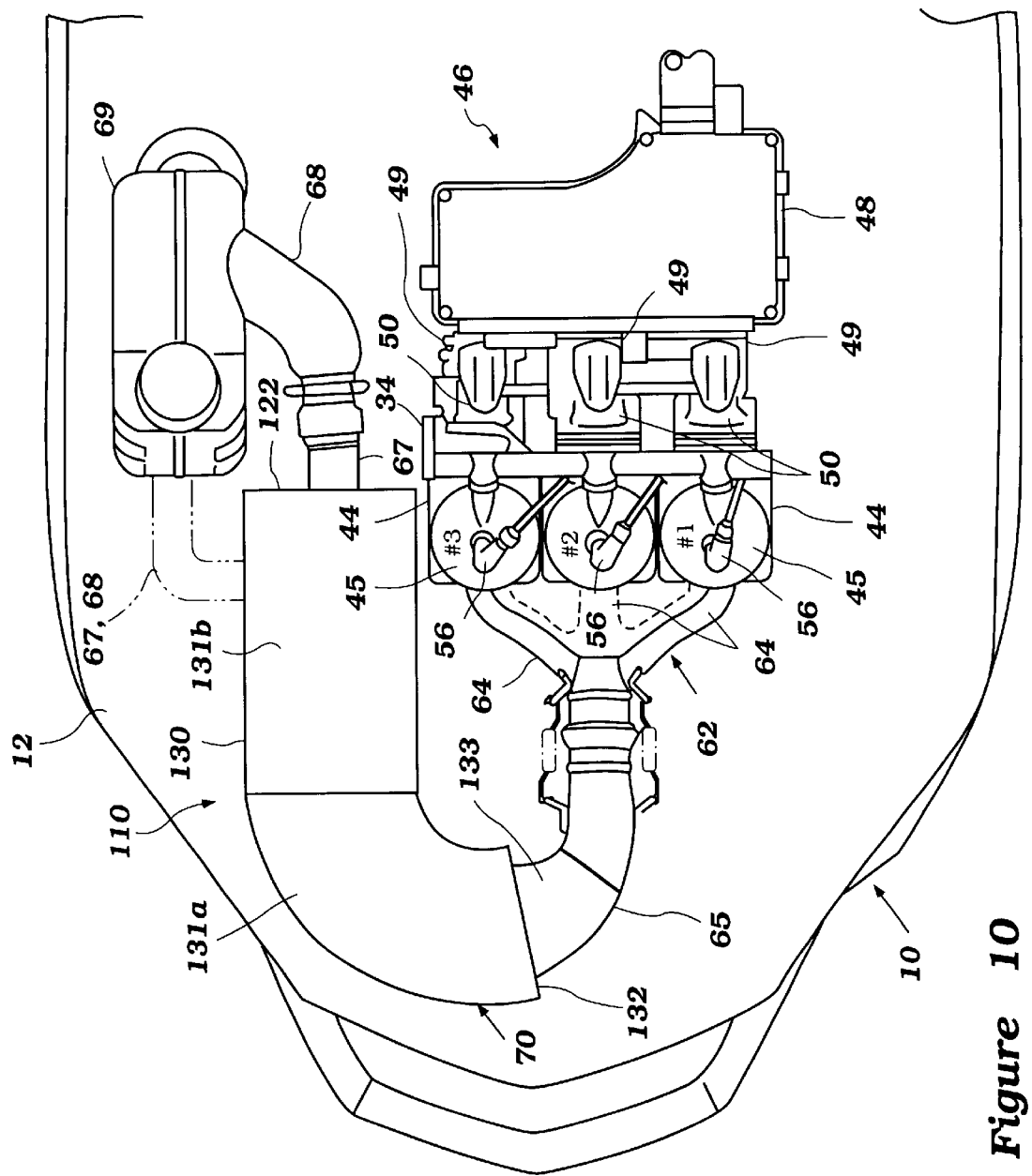
FIG. 10 is a partial plan view showing a snowmobile embodying still another arrangement of an exhaust conduit.

Still another embodiment is shown in FIG. 10. An expansion chamber 130 in this embodiment is also formed with two pieces 131a,b. The upstream portion 131a is curved and the downstream portion 131b is shaped straight and generally rectangular. The utmost upstream end 132 of the curved portion 131a is shaped as a step. In other words, the utmost upstream end portion (step portion) 132 is abruptly expanded rather than a portion 133 positioned immediately upstream. The positive pressure reflected at the downstream end portion 122 is further attenuated by this step 132 as well as its large volume.

The structures described above and shown in FIGS. 9 and 10 are also useful. Because these structures are simple and they contribute for lightening the exhaust duct 65.

The attenuation mechanism 110 may have a variety of shapes. With reference to the several types of the exhaust conduit shown in FIG. 11 again, the type A is the same one as shown in FIGS. 6 and 7. The type C has the step 132 upstream of the straight chamber 134. The type D has a relatively long straight chamber 136. The type E has a relatively thick tail pipe 138 and hence the convergent cone indicated with the reference numeral 139 is not so shrunk. These types D and E are also useful as the attenuation mechanism 110.

FIG. 11, at the left-hand side of the several types of the exhaust conduit, illustrates a graphical view showing the characteristics of respective types in the relationship of engine speed versus engine output.

The respective characteristics 150, 152, 154, 156 and 158 correspond to the types A, B, C, D and E. The type B is the conventional one as described above. The exhaust conduits A through D are provided on a three cylinder engine wherein respective cylinders are fired at intervals of 120 degrees in the crankshaft rotation angle relative to each other. The exhaust conduit E is provided on a three cylinder engine wherein the entire cylinders are fired simultaneously. As seen in the graph, the characteristics of the types A and C through E are generally better than the characteristic of the type B in engine output, particularly, at relatively high engine speed.

As described above, by providing the attenuation mechanism 110, the positive pressure component of the exhaust pulsation wave will be removed or reduced. Accordingly, this positive pressure component is not utilized in these embodiments. This means that the trapping efficiency of intake charge may somewhat deteriorate. However, undesirable influence by the positive pressure wave to the other cylinders is greatly decreased and the delivery ratio is still kept in good conditions. Thus, the engine output is well improved as seen in the graph.

It should be noted that another device such as a variable exhaust timing device can be of course applied in those embodiments without damaging the effect described above.

It should be also noted that this invention is practicable on other two stroke, multiple engines which power other land vehicles such as golf carts and lawn mowers and also water vehicles.

Of course, the foregoing description is that of preferred embodiments of the invention, and various changes and modifications may be made without departing from the spirit and scope of the invention, as defined by the appended claims.

What is claimed is:

1. A two stroke crankcase compression internal combustion engine for a snowmobile comprising three combustion chambers for burning air fuel mixtures therein, the three combustion chambers having generally the same size, a firing system for firing the respective air fuel mixtures in said three combustion chambers, and an exhaust system for discharging exhaust gasses from said three combustion chambers, said exhaust system having a single exhaust conduit collecting the exhaust gasses, and two of said three combustion chambers being fired generally simultaneously by said firing system.

2. A two stroke crankcase compression internal combustion engine as set forth in claim 1 wherein a firing timing of the two of said tire combustion chambers and a firing timing of the rest of said three combustion chambers are different relative to each other generally maximum.

3. A two stroke crankcase compression internal combustion engine as set forth in claim 1 wherein the rest of said three combustion chambers is fired at intervals of 180 degrees in crankshaft rotation angle relative to the two of said three combustion chambers.

4. A two stroke crankcase compression internal combustion engine as set forth in claim 1 wherein the two of said three combustion chambers that are fired generally simultaneously have a decompression mechanism at least at one of said three combustion chambers for decompressing the one of said three combustion chambers when said engine is started.

5. A two stroke crankcase compression internal combustion engine as set forth in claim 4 wherein said single exhaust conduit has an attenuation mechanism for attenuating positive pressure reflection waves generated in said exhaust system.

6. A two stroke crankcase compression internal combustion engine as set forth in claim 1 wherein said single exhaust conduit has an attenuation mechanism for attenuating positive pressure reflection waves generated in said exhaust conduit.

7. A two stroke crankcase compression internal combustion engine as set forth in claim 1 wherein said engine powers a snowmobile.

8. A two stroke crankcase compression internal combustion engine for a snowmobile comprising three combustion chambers for burning air fuel mixtures therein, the three combustion chambers being juxtaposed with one another and having generally the same size, a firing system for firing the respective air fuel mixtures in said three combustion chambers, and an exhaust system for discharging the exhaust gasses from said three combustion chambers, said exhaust system having a single exhaust conduit collecting the exhaust gasses, and at least the two of said three combustion chambers being fired generally simultaneously by, said firing system.

9. A two stroke crankcase compression internal combustion engine as set forth in claim 8 wherein one of said three combustion chambers has a decompression mechanism for decompressing one of said three combustion chambers when said engine is started.

10. A two stroke crankcase compression internal combustion engine as set forth in claim 9 wherein said single exhaust conduit has an attenuation mechanism for attenuating positive pressure reflection waves generated in said exhaust conduit.

11. A two stroke crankcase compression internal combustion engine as set forth in claim 8 wherein said single exhaust conduit has an attenuation mechanism for attenuating positive pressure reflection waves generated in said exhaust conduit.

12. A two stroke crankcase compression internal combustion engine for a snowmobile comprising thee combustion chambers for burning air fuel mixtures therein, two of said three combustion chambers being fired generally simultaneously, and an exhaust system for discharging exhaust gasses from said three combustion chambers, said exhaust system including an exhaust manifold disposed next to said three combustion chambers to collect the exhaust gasses from said three combustion chambers, and a single exhaust conduit having an inlet port coupled with said exhaust manifold, and an attenuation mechanism for attenuating positive pressure reflection waves generated in said exhaust conduit, said attenuation mechanism being disposed downstream of said inlet port.

13. A two stroke crankcase compression internal combustion engine as set forth in claim 12 wherein said exhaust system has a barrier for impeding flow of the exhaust gasses.

14. A two stroke crankcase compression internal combustion engine as set forth in claim 13 wherein said barrier includes an inner duct tapered downstream, and said inner duct has a plurality of apertures formed on a tapered surface of said inner duct to allow the exhaust gasses flowing therethrough.

15. A two stroke crankcase compression internal combustion engine as set forth in claim 14 wherein said inner duct has an opening formed at the utmost downstream end of said inner duct.

16. A two stroke crankcase compression internal combustion engine as set forth in claim 13 wherein said attenuation mechanism includes an expansion chamber positioned upstream of said barrier.

17. A two stroke crankcase compression internal combustion engine as set forth in claim 16 wherein a volume of said expansion chamber is at least five times as large as the entire volume of said three combustion chambers.

18. A two stroke crankcase compression internal combustion engine as set forth in claim 13 wherein said attenuation mechanism includes a portion positioned upstream of said barrier, and said portion abruptly expands downstream.

19. A two stroke crankcase compression internal combustion engine as set forth in claim 12 wherein at least one of said three combustion chambers has a decompression mechanism for decompressing the one of said three combustion chambers when said engine is started.

20. A method for firing a two stroke crankcase compression internal combustion engine having three combustion chambers for burning air fuel mixtures therein, the three combustion chambers having generally the same size, and an exhaust system for discharging exhaust gasses from said three combustion chambers, said exhaust system having a single exhaust conduit collecting the exhaust gasses, said method comprising firing two of said three combustion chambers generally simultaneously, discharging exhaust gases of the two of said three combustion chambers through said single exhaust conduit, firing the rest of said three combustion chambers at a different timing relative to the two of said three combustion chambers, and discharging exhaust gases of the rest of said three combustion chambers through said single exhaust conduit.

21. A method as set forth in claim 20 wherein the firing of the rest of said three combustion chambers occurs apart generally maximum from the firing of the two of said three combustion chambers.

22. A method as set forth in claim 20 wherein the firing of the rest of said three combustion chambers occurs at intervals of 180 degrees in crankhaft rotation angle relative to the firing of the two of said three combustion chambers.

23. A method for firing a two stroke crankcase compression internal combustion engine having three combustion chambers for bulking air fuel mixtures therein, the three combustion chambers having generally the same size, and an exhaust system for discharging exhaust gasses from said three combustion chambers, said exhaust system having a single exhaust conduit collecting the exhaust gasses, said method comprising firing two of said three combustion chambers generally simultaneously.

24. An internal combustion engine comprising a cylinder block defining three cylinder bores in which pistons reciprocate, a cylinder head member affixed to one ends of the cylinder bores to define three combustion chambers with the cylinder bores and the pistons, the three combustion chambers having generally the same size, an air induction system arranged to introduce air into the three combustion chambers, a fuel supply system arranged to supply fuel into the three combustion chambers, the air and the fuel being mixed in the three combustion chambers to be an air fuel mixture, a firing system arranged to fire the air fuel mixture, and an exhaust system arranged to discharge a burnt charge from the three combustion chambers, the exhaust system including a single exhaust passage, the three combustion chambers being separated to two combustion chambers and one combustion chamber, and the firing system firing the two combustion chambers and the one combustion chamber at different timings that are apart generally maximum from each other timing.

25. An internal combustion engine as set forth in claim 24 wherein at least one of the three combustion chambers has a decompression mechanism.

26. An internal combustion engine as set forth in claim 24 wherein the single exhaust passage includes an attenuation mechanism arranged to attenuate positive reflection waves generated in the exhaust system.

27. An internal combustion engine for a snowmobile comprising a cylinder block defining three cylinder bores in which pistons reciprocate, the cylinder bores extending in parallel to one another, a cylinder head member affixed to one ends of the cylinder bores to define three combustion chambers with the cylinder bores and the pistons, the three combustion chambers having generally the same size, an air induction system arranged to introduce air into the three combustion chambers, a fuel supply system arranged to supply fuel into the three combustion chambers, the air and the fuel being mixed in the three combustion chambers to be an air fuel mixture, a firing system arranged to fire the air fuel mixture, and an exhaust system arranged to discharge a burnt charge from the three combustion chambers, the exhaust system including a single exhaust passage, and the firing system firing two of the combustion chambers generally simultaneously.

28. An exhaust system for a two stroke crankcase compression internal combustion engine having tree combustion chambers, two of said three combustion chambers being fired generally simultaneously, comprising an exhaust manifold disposed next to said three combustion chambers to collect exhaust gases from the three combustion chambers, said exhaust manifold having an outlet port, a single exhaust passage communicating with the outlet port, and an attenuation mechanism arranged to attenuate positive pressure reflection waves, the attenuation mechanism being positioned downstream of the outlet port and within the exhaust passage.

29. An exhaust system as set forth in claim 28 additionally comprising an inner duct tapered downstream and positioned downstream of the outlet port, wherein said inner duct has a plurality of apertures formed on a tapered surface of said inner duct, through which the exhaust gasses pass downstream.

30. An exhaust system as set forth in claim 29 wherein said inner duct has an opening disposed at the downstream end thereof.

31. An exhaust system as set forth in claim 30 wherein said attenuation mechanism includes an expansion chamber positioned upstream of said inner duct.

32. An exhaust system as set forth in claim 28 wherein said attenuation mechanism includes a portion positioned upstream of said inner duct, and said portion abruptly expands downstream.

\* \* \* \* \*

UNITED STATES PATENT AND TRADEMARK OFFICE
CERTIFICATE OF CORRECTION

PATENT NO.     : 6,415,747 B1
DATED          : July 9, 2002
INVENTOR(S)    : Asano et al.

It is certified that error appears in the above-identified patent and that said Letters Patent is hereby corrected as shown below:

<u>Title page,</u>
Item [56], References Cited, U.S. PATENT DOCUMENTS, please add:
-- 6,273,014     -8/2001         Suzuki          114/55.57 --

Signed and Sealed this

Fifteenth Day of April, 2003

JAMES E. ROGAN
*Director of the United States Patent and Trademark Office*